United States Patent
Arunmozhi et al.

(10) Patent No.: US 11,913,852 B2
(45) Date of Patent: Feb. 27, 2024

(54) SENSOR SYSTEM CLEANING WITH VALVE TESTING

(71) Applicant: Ford Global Technologies, LLC, Dearborn, MI (US)

(72) Inventors: Ashwin Arunmozhi, Canton, MI (US); Venkatesh Krishnan, Canton, MI (US); Segundo Baldovino, Novi, MI (US); Kunal Singh, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 832 days.

(21) Appl. No.: 17/008,879

(22) Filed: Sep. 1, 2020

(65) Prior Publication Data
US 2022/0065745 A1 Mar. 3, 2022

(51) Int. Cl.
*G01M 13/003* (2019.01)
*B08B 3/02* (2006.01)
*B08B 3/08* (2006.01)
*B08B 13/00* (2006.01)
*B60S 1/50* (2006.01)
*B60S 1/52* (2006.01)
(Continued)

(52) U.S. Cl.
CPC ............ *G01M 13/003* (2019.01); *B08B 3/02* (2013.01); *B08B 3/08* (2013.01); *B08B 13/00* (2013.01); *B60S 1/52* (2013.01); *B60W 60/0015* (2020.02); *G06T 7/0002* (2013.01); *H04N 23/52* (2023.01); *B60S 1/50* (2013.01); *B60W 2420/42* (2013.01); *G01S 7/497* (2013.01); *G01S 2007/4977* (2013.01)

(58) Field of Classification Search
CPC ... B08B 13/00; B08B 3/02; B08B 3/08; B60S 1/481; B60S 1/50; B60S 1/52; B60S 1/56; B60W 2050/0215; B60W 2420/42; B60W 50/02; B60W 60/0015; G01M 13/003; G01S 17/931; G01S 2007/4977; G01S 7/497; G06T 7/0002; H04N 23/52
See application file for complete search history.

(56) References Cited

U.S. PATENT DOCUMENTS 6,805,164 B2 * 10/2004 Stouffer .................... F15C 1/22
137/806
11,046,288 B2 * 6/2021 Rice .......................... B60S 1/56
(Continued)

FOREIGN PATENT DOCUMENTS

CN 109204239 A * 1/2019
CN 111348002 A * 6/2020
(Continued)

*Primary Examiner* — Babar Sarwar
(74) *Attorney, Agent, or Firm* — Frank A. MacKenzie; Bejin Bieneman PLC (57) ABSTRACT

A sensor system includes a pump, a valve supplied from the pump, a sensor fixed relative to the pump, a nozzle supplied from the valve and aimed at the sensor, and a computer communicatively coupled to the pump, the valve, and the sensor. The computer is programmed to instruct the pump to operate; while the pump is operating, instruct the valve to close; receive data from the sensor while the pump is operating and the valve is instructed to be closed; and set a flag upon determining, based on the data received from the sensor, that the nozzle is outputting fluid onto the sensor.

20 Claims, 5 Drawing Sheets

(51) Int. Cl.
B60W 60/00 (2020.01)
G01S 7/497 (2006.01)
G06T 7/00 (2017.01)
H04N 23/52 (2023.01)

(56) References Cited

U.S. PATENT DOCUMENTS

| | | | |
|---|---|---|---|
| 11,059,459 B2* | 7/2021 | Giraud | G02B 27/0006 |
| 11,180,119 B2* | 11/2021 | Dingli | B60S 1/486 |
| 11,703,570 B2* | 7/2023 | Krishnan | G01S 7/4813 |
| | | | 356/4.01 |
| 2003/0029932 A1* | 2/2003 | Nakano | B60S 1/603 |
| | | | 239/70 |
| 2011/0292212 A1* | 12/2011 | Tanabe | B05B 1/08 |
| | | | 348/148 |
| 2014/0009616 A1* | 1/2014 | Nakamura | H04N 5/14 |
| | | | 348/148 |
| 2015/0138357 A1* | 5/2015 | Romack | B60S 1/52 |
| | | | 348/148 |
| 2019/0135239 A1* | 5/2019 | Rice | B60S 1/52 |
| 2019/0135240 A1* | 5/2019 | Rice | B60S 1/522 |
| 2020/0061643 A1* | 2/2020 | Rachow | B05B 7/0892 |
| 2020/0108801 A1* | 4/2020 | Frederick | B60S 1/481 |
| 2021/0309186 A1* | 10/2021 | Rice | G01S 17/931 |
| 2022/0234545 A1* | 7/2022 | Herse | B60W 60/00 |

FOREIGN PATENT DOCUMENTS

| | | | |
|---|---|---|---|
| DE | 102020121449 A1 * | 2/2022 | |
| JP | 2020006716 A | 1/2020 | |
| KR | 100866350 B1 | 10/2008 | |

\* cited by examiner

SENSOR SYSTEM CLEANING WITH VALVE TESTING

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

A system includes a pump, a valve supplied from the pump, a sensor fixed relative to the pump, a nozzle supplied from the valve and aimed at the sensor, and a computer communicatively coupled to the pump, the valve, and the sensor. The computer is programmed to instruct the pump to operate; while the pump is operating, instruct the valve to close; receive data from the sensor while the pump is operating and the valve is instructed to be closed; and set a flag upon determining, based on the data received from the sensor, that the nozzle is outputting fluid onto the sensor.

The system may further include a flowmeter positioned to monitor flow from the valve to the nozzle, and the computer may be further programmed to receive data from the flowmeter while the pump is operating and the valve is instructed to be closed, and to set the flag upon determining, based on the data received from the flowmeter, that flow is occurring from the valve to the nozzle.

The valve may be a solenoid valve.

The sensor may be a camera including a lens, and the nozzle is aimed at the lens.

A computer includes a processor and a memory storing instructions executable by the processor to instruct a pump to operate; while the pump is operating, instruct a valve supplied from the pump to close; receive data from a sensor while the pump is operating and the valve is instructed to be closed; and set a flag upon determining, based on the data received from the sensor, that a nozzle supplied from the valve is outputting fluid onto the sensor.

The flag may be a first flag or a second flag, and the instructions may further include to set a first flag upon identifying, based on the data received from the sensor, a spray pattern of fluid outputted by the nozzle onto the sensor as a first spray pattern, and set a second flag upon identifying, based on the data received from the sensor, the spray pattern of fluid outputted by the nozzle onto the sensor as a second spray pattern. The first spray pattern may indicate that the valve is in a partially open position, and the second spray pattern may indicate that the valve is in a fully open position.

The instructions may further include to set the flag upon determining that the nozzle is outputting fluid onto the sensor and that an alternative source of fluid is not causing fluid to appear on the sensor. The nozzle may be a first nozzle, and the alternative source of fluid may be one of precipitation or a second nozzle.

The instructions may further include to receive data from a flowmeter positioned to monitor flow from the valve to the nozzle, and the data may be received while the pump is operating and the valve is instructed to be closed, and the instructions may further include to set the flag upon determining, based on the data received from the flowmeter, that flow is occurring from the valve to the nozzle. The flag may be a first flag or a second flag, the instructions may further include to set a first flag upon determining, based on the data received from the flowmeter that a flowrate from the valve to the nozzle is in a first range of flowrates, and set a second flag upon determining, based on the data received from the flowmeter that the flowrate from the valve to the nozzle is in a second range of flowrates. The first range of flowrates may indicate that the valve is in a partially open position, and the second range of flowrates may indicate that the valve is in a fully open position.

The instructions may further include to, in response to setting the flag, autonomously operate a vehicle including the sensor while disregarding data received from the sensor.

The instructions may further include to, in response to setting the flag, autonomously operate a vehicle including the sensor to perform a minimal risk maneuver.

The instructions may further include to, in response to setting the flag, upon determining that the sensor is a member of a first set of sensors, autonomously operate a vehicle including the sensor while disregarding data received from the sensor, and in response to setting the flag, upon determining that the sensor is a member of a second set of sensors, autonomously operate a vehicle including the sensor to perform a minimal risk maneuver.

The instructions may further include to, in response to a request to wash the sensor, instruct the pump to operate and the valve to open. The instructions may further include to, upon determining that the request to wash the sensor is complete, perform the steps of instructing the pump to operate, instructing the valve to close, receiving the data from the sensor, and setting the flag upon determining that the nozzle is outputting fluid onto the sensor.

The instructions may further include to, upon determining that a timer has expired, perform the steps of instructing the pump to operate, instructing the valve to close, receiving the data from the sensor, and setting the flag upon determining that the nozzle is outputting fluid onto the sensor.

The instructions may further include to, upon determining that a vehicle including the sensor has started, perform the steps of instructing the pump to operate, instructing the valve to close, receiving the data from the sensor, and setting the flag upon determining that the nozzle is outputting fluid onto the sensor.

A method includes instructing a pump to operate; while the pump is operating, instructing a valve supplied by the pump to close; receiving data from a sensor while the pump is operating and the valve is instructed to be closed; and setting a flag upon determining, based on the data received from the sensor, that a nozzle supplied from the valve is outputting fluid onto the sensor.

With reference to the Figures, a sensor system 32 of a vehicle 30 includes a pump 34; at least one valve 36 supplied from the pump 34; for each valve 36, a sensor 38 fixed relative to the pump 34; for each pairing of one valve 36 and sensor 38, a nozzle 40 supplied from the respective valve 36 and aimed at the respective sensor 38; and a computer 42 communicatively coupled to the pump 34, the valves 36, and the sensors 38. For each valve 36, the computer 42 is programmed to instruct the pump 34 to operate; while the pump 34 is operating, instruct that valve 36 to close; receive data from the respective sensor 38 while the pump 34 is operating and the respective valve 36 is instructed to be closed; and set a flag upon determining, based on the data received from the respective sensor 38, that the respective nozzle 40 is outputting fluid onto the respective sensor 38.

The sensor system 32 can enhance the reliability of the valves 36. The sensor system 32 can determine whether each valve 36 is stuck in a fully open or partially open position despite being instructed to switch to a closed position. If the valves 36 are solenoid valves, then movement between the open position and closed position is small, e.g., less than 0.4 millimeters. Because of that small size, sensors such as microswitches, Hall effect sensors, and other diagnostics may be unavailable for determining the positions of the valves 36. Moreover, the sensor system 32 can test the positions of the valves 36 without adding sensors for directly measuring the positions of the valves 36, or can redundantly check such sensors if present.

Figure 1:
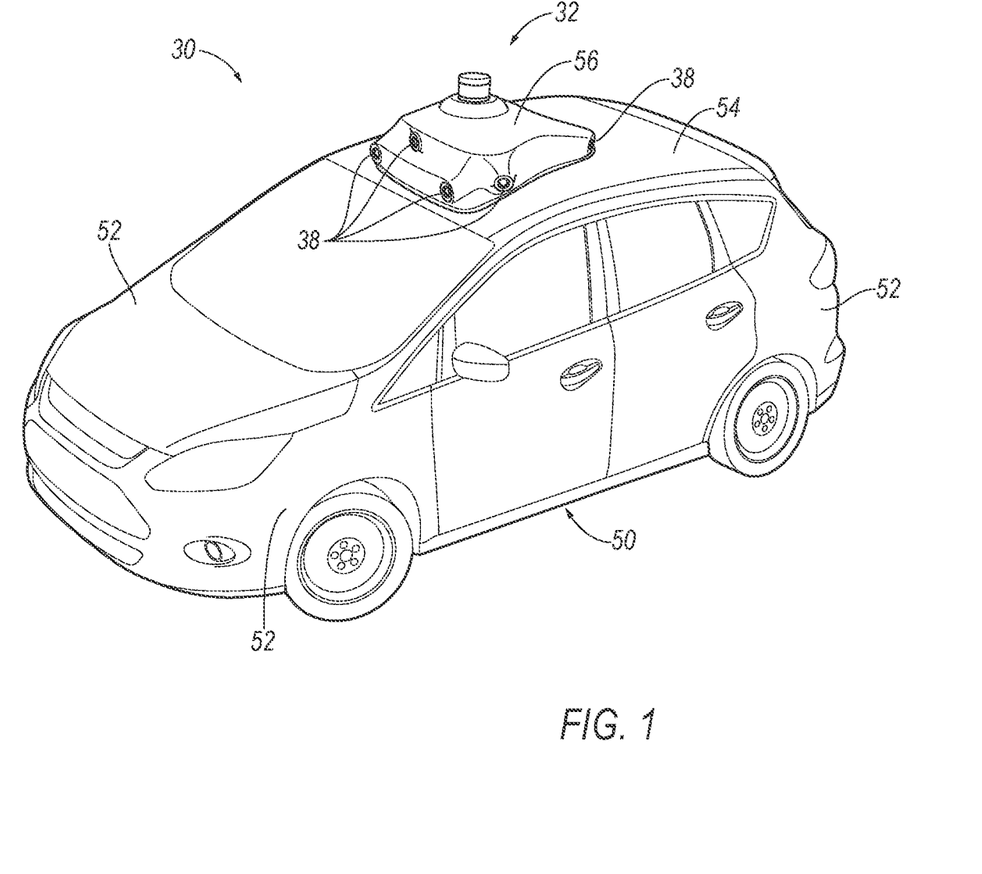
FIG. 1 is a perspective view of an example vehicle.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. The computer 42 can be programmed to operate the vehicle 30 independently of the intervention of a human driver, completely or to a lesser degree. The computer 42 may be programmed to operate a propulsion 44, a brake system 46, a steering system 48, and/or other vehicle systems. For the purposes of this disclosure, autonomous operation means the computer 42 controls the propulsion 44, brake system 46, and steering system 48 without input from a human driver; semi-autonomous operation means the computer 42 controls one or two of the propulsion 44, brake system 46, and steering system 48 and a human driver controls the remainder; and nonautonomous operation means a human driver controls the propulsion 44, brake system 46, and steering system 48.

The vehicle 30 includes a body 50. The vehicle 30 may be of a unibody construction, in which a frame and the body 50 of the vehicle 30 are a single component. The vehicle 30 may, alternatively, be of a body-on-frame construction, in which the frame supports the body 50 that is a separate component from the frame. The frame and body 50 may be formed of any suitable material, for example, steel, aluminum, etc.

The body 50 includes body panels 52 partially defining an exterior of the vehicle 30. The body panels 52 may present a class-A surface, e.g., a finished surface exposed to view by a customer and free of unaesthetic blemishes and defects. The body panels 52 include, e.g., a roof 54, etc.

The sensor system 32 includes a housing 56 for the sensors 38. The housing 56 is attachable to the vehicle 30, e.g., to one of the body panels 52 of the vehicle 30, e.g., the roof 54. For example, the housing 56 may be shaped to be attachable to the roof 54, e.g., may have a shape matching a contour of the roof 54. The housing 56 may be attached to the roof 54, which can provide the sensor 38 with an unobstructed field of view of an area around the vehicle 30. The housing 56 may be formed of, e.g., plastic or metal.

The sensors 38 detect the external world, e.g., objects and/or characteristics of surroundings of the vehicle 30, such as other vehicles, road lane markings, traffic lights and/or signs, pedestrians, etc. For example, the sensors 38 may be radar sensors, scanning laser range finders, light detection and ranging (LIDAR) devices, or image processing sensors such as cameras. Each sensor 38 includes a sensor window 58. Each sensor 38 has a field of view through the respective sensor window 58. If the sensors 38 are cameras, the sensor windows 58 can be lenses.

The sensors 38 can be mounted in the housing 56. The sensors 38 are fixed relative to the pump 34, e.g., the sensors 38 and the pump 34 are both mounted in a fixed position relative to the body 50 of the vehicle 30. The sensors 38 can be arranged to collectively have a 360° horizontal field of view of an area surrounding the vehicle 30.

Figure 2:
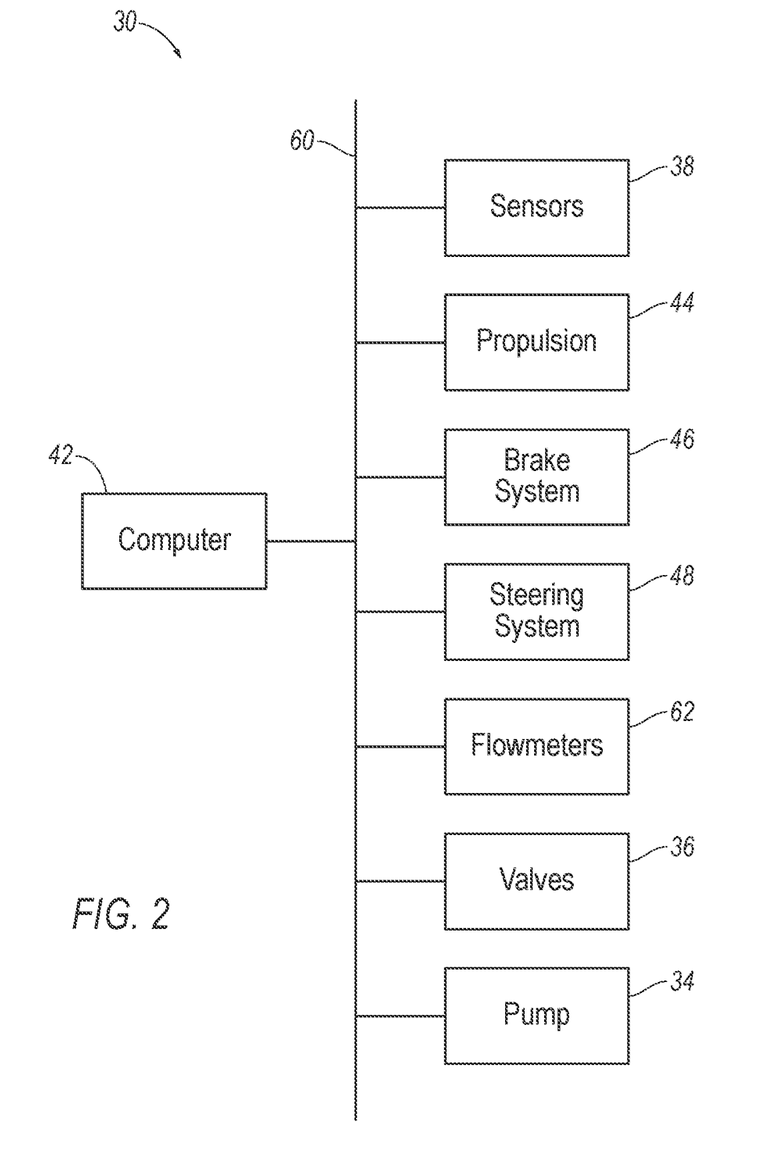
FIG. 2 is a block diagram of the vehicle.

With reference to FIG. 2, the computer 42 is a microprocessor-based computing device, e.g., a generic computing device including a processor and a memory, an electronic controller or the like, a field-programmable gate array (FPGA), an application-specific integrated circuit (ASIC), etc. The computer 42 can thus include a processor, a memory, etc. The memory of the computer 42 can include media for storing instructions executable by the processor as well as for electronically storing data and/or databases, and/or the computer 42 can include structures such as the foregoing by which programming is provided. The computer 42 can be multiple computers coupled together.

The computer 42 may transmit and receive data through a communications network 60 such as a controller area network (CAN) bus, Ethernet, WiFi, Local Interconnect Network (LIN), onboard diagnostics connector (OBD-II), and/or by any other wired or wireless communications network. The computer 42 may be communicatively coupled to the sensors 38, the propulsion 44, the brake system 46, the steering system 48, a plurality of flowmeters 62, the valves 36, the pump 34, and other components via the communications network 60.

The propulsion 44 of the vehicle generates energy and translates the energy into motion of the vehicle. The propulsion 44 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 44 can include an electronic control unit (ECU) or the like that is in communication with and receives input from the computer and/or a human driver. The human driver may control the propulsion 44 via, e.g., an accelerator pedal and/or a gear-shift lever.

The brake system 46 is typically a conventional vehicle braking subsystem and resists the motion of the vehicle to thereby slow and/or stop the vehicle. The brake system 46 may include friction brakes such as disc brakes, drum brakes, band brakes, etc.; regenerative brakes; any other suitable type of brakes; or a combination. The brake system 46 can include an electronic control unit (ECU) or the like that is in communication with and receives input from the computer and/or a human driver. The human driver may control the brake system 46 via, e.g., a brake pedal.

The steering system 48 is typically a conventional vehicle steering subsystem and controls the turning of the wheels. The steering system 48 may be a rack-and-pinion system with electric power-assisted steering, a steer-by-wire system, as both are known, or any other suitable system. The steering system 48 can include an electronic control unit (ECU) or the like that is in communication with and receives input from the computer and/or a human driver. The human driver may control the steering system 48 via, e.g., a steering wheel.

Figure 3:
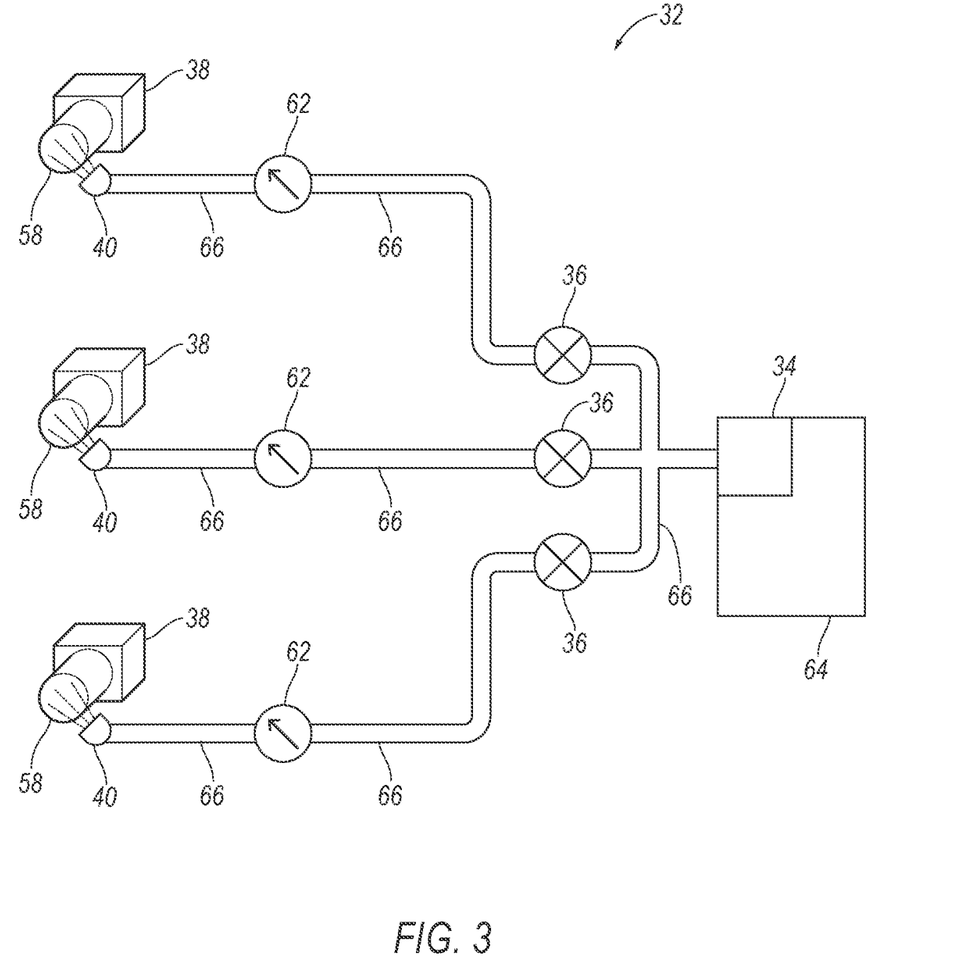
FIG. 3 is a diagram of a sensor system of the vehicle.

With reference to FIG. 3, the sensor system 32 includes a reservoir 64, the pump 34, liquid supply lines 66, the at least one valve 36, and the at least one nozzle 40. The reservoir 64, the pump 34, the valves 36, and the nozzles 40 are fluidly connected to each other (i.e., fluid can flow from one to the other). Fluid flows from the pump 34 to the valves 36 and from each valve 36 to the respective nozzle 40. The nozzles 40 are supplied from the valves 36, which are supplied from the pump 34. If the housing 56 contains multiple sensors 38, then one valve 36 and one nozzle 40 can be provided for each sensor 38. The sensor system 32 distributes washer fluid stored in the reservoir 64 to the nozzles 40. "Washer fluid" is any liquid stored in the reservoir 64 for cleaning. The washer fluid may include solvents, detergents, diluents such as water, etc.

The reservoir 64 may be a tank fillable with liquid, e.g., washer fluid for window cleaning. The reservoir 64 may be disposed in the housing 56 or may be disposed in a front of the vehicle 30, specifically, in an engine compartment forward of a passenger cabin. The reservoir 64 may store the washer fluid only for supplying the sensor system 32 or also for other purposes, such as supply to a windshield.

The pump 34 is positioned to pump fluid from the reservoir 64 to the valves 36 and then the nozzles 40. The pump 34 may force the washer fluid through the liquid supply lines 66 to the nozzles 40 with sufficient pressure that the washer fluid sprays from the nozzles 40. The pump 34 is fluidly connected to the reservoir 64. The pump 34 may be attached to or disposed in the reservoir 64.

The liquid supply lines 66 extend from the pump 34 to the valves 36 and from each valve 36 to the respective nozzle 40. The liquid supply lines 66 may be, e.g., flexible tubes.

Each valve 36 is positioned and operable to control fluid flow from the pump 34 to one of the nozzles 40. Specifically, fluid from the liquid supply line 66 from the pump 34 must flow through one of the valves 36 to reach the respective liquid supply line 66 providing fluid to the respective nozzle 40. The valves 36 control flow by being actuatable between an open position permitting flow and a closed position blocking flow from the incoming to the outgoing of the liquid supply lines 66. The valves 36 can be solenoid valves. As a solenoid valve, each valve 36 includes a solenoid and a plunger. Electrical current through the solenoid generates a magnetic field, and the plunger moves in response to changes in the magnetic field. The solenoid moves the plunger between a position in which the valve 36 is open and a position in which the valve 36 is closed. If debris such as dirt enters the valve 36, the solenoid may activate to move the plunger to a closed position, but the debris may prevent the plunger from fully moving, leaving the valve 36 in a partially open position.

The nozzles 40 are positioned to receive fluid from the respective valves 36 via the respective liquid supply line 66. Each nozzle 40 is aimed at the respective sensor window 58 of the respective sensor 38.

The sensor system 32 includes the plurality of flowmeters 62, specifically one flowmeter 62 for each valve 36. Each flowmeter 62 is positioned to monitor flow from the respective valve 36 to the respective nozzle 40, e.g., fluidly connected to the respective liquid supply line 66 extending from the respective valve 36 to the respective nozzle 40. The flowmeters 62 can be any suitable devices for measuring bulk fluid movement, e.g., differential-pressure flowmeters, variable-area flowmeters, electromagnetic flowmeters, positive-displacement flowmeters, fluid-dynamic flowmeters, anemometers, ultrasonic flowmeters, mass flowmeters, etc. The flowmeters 62 output data indicating a volume of liquid per unit time, e.g., liters per second (L/s).

Figure 4:
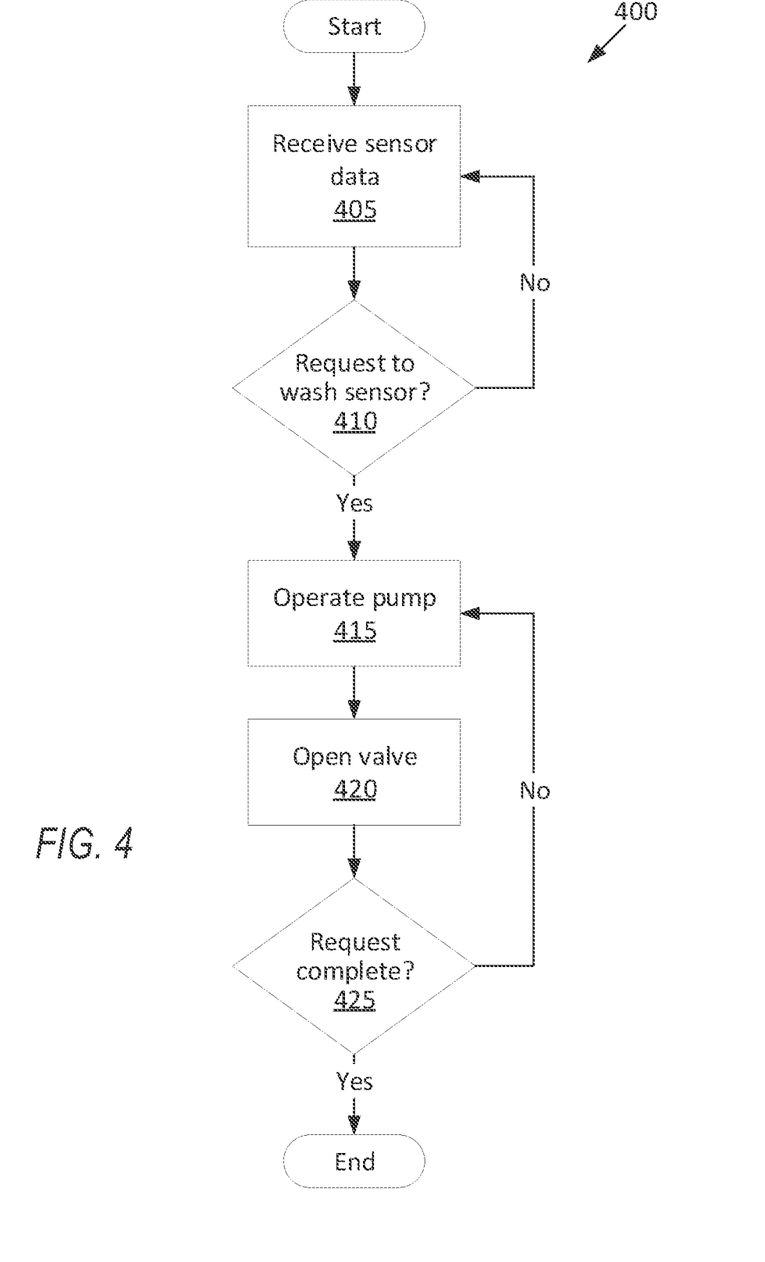
FIG. 4 is a process flow diagram of an example process for cleaning a sensor of the vehicle.

FIG. 4 is a process flow diagram illustrating an exemplary process 400 for cleaning one of the sensors 38. The memory of the computer 42 stores executable instructions for performing the steps of the process 400 and/or programming can be implemented in structures such as mentioned above. As a general overview of the process 400, in response to a request to wash the sensor 38, the computer 42 instructs the pump 34 to operate and the valve 36 to open until the request is complete. The process 400 is performed individually for each of the sensors 38.

The process 400 begins in a block 405, in which the computer 42 receives data from the sensor 38. For example, if the sensor 38 is a camera, the data are a sequence of image frames of the field of view of the sensor 38. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor 38 at the time that the image frame was recorded, can be specified in pixel dimensions or coordinates, e.g., an ordered pair of pixel distances, such as a number of pixels from a top edge and a number of pixels from a left edge of the field of view.

Next, in a decision block 410, the computer 42 determines whether there is a request to wash the sensor 38. For example, the request to wash the sensor 38 can be based on whether there is an obstruction on the sensor window 58, e.g., by the computer 42 determining that a region of the image frames is unchanging over several frames. For another example, the request to wash the sensor 38 can be based on expiration of a timer. The timer can be set to expire at a time at which the sensor window 58 is likely to have gotten dirty. For another example, the request to wash the sensor 38 can be triggered by a state of the vehicle 30, e.g., a gear of the vehicle 30 being put into park. For another example, the request to wash the sensor 38 can be an input by an operator of the vehicle 30. If no request to wash the sensor 38 has occurred, the process 400 returns to the block 405 to continue monitoring data from the sensor 38. If there is a request to wash the sensor 38, the process 400 proceeds to a block 415.

In the block 415, the computer 42 instructs the pump 34 to operate, i.e., to either begin or continue pumping.

Next, in a block 420, the computer 42 instructs the valve 36 to open, permitting fluid to flow from the pump 34 to the nozzle 40 to wash the sensor window 58.

Next, in a decision block 425, the computer 42 determines whether the request to wash the sensor 38 is complete. For example, the computer 42 may determine that a preset duration has elapsed since the valve 36 was opened. The preset duration can be chosen based on experimentally testing how long the nozzle 40 takes to clean an obstruction from the sensor window 58. For another example, the computer 42 may determine that the obstruction is no longer present on the sensor 38, perhaps while temporarily closing the valve 36, in the manner described above with respect to the decision block 410. If the request to wash the sensor 38 is not yet complete, the process 400 returns to the block 415 to continue operating the pump 34 and leaving the valve 36 open. If the request to wash the sensor 38 is complete, the process 400 ends.

Figure 5:
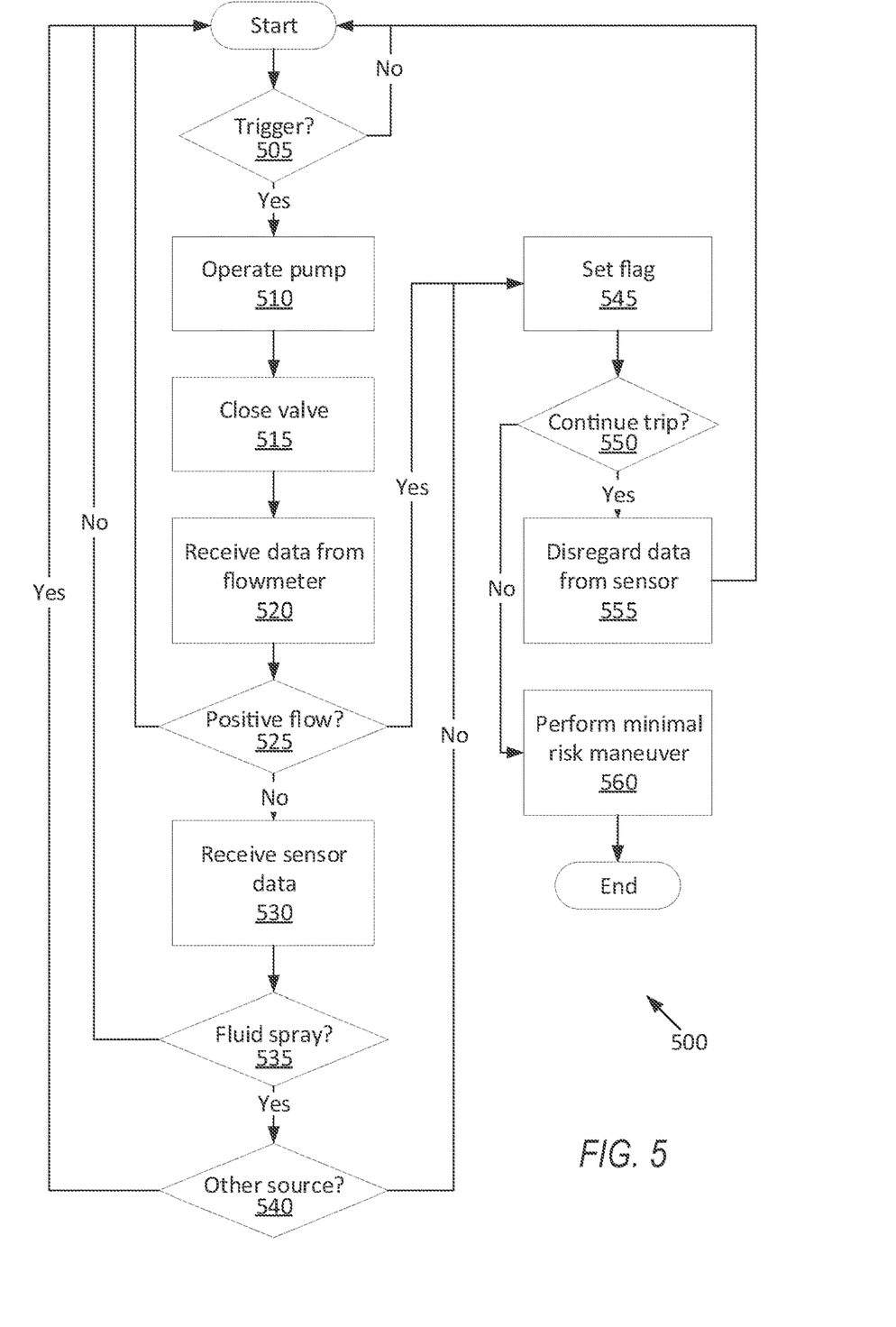
FIG. 5 is a process flow diagram of an example process for testing a valve of the sensor system of the vehicle.

FIG. 5 is a process flow diagram illustrating an exemplary process 500 for testing one of the valves 36. The memory of the computer 42 stores executable instructions for performing the steps of the process 500 and/or programming can be implemented in structures such as mentioned above. As a general overview of the process 500, upon occurrence of a trigger, the computer 42 operates the pump 34 while instructing the valve 36 to stay closed, and sets a flag indicating that the valve 36 is fully or partially open in response to the flowmeter 62 indicating a positive rate of flow or in response to detecting a spray pattern of fluid in data from the sensor 38. If the flag is set, the computer 42 either disregards data from that sensor 38 while continuing a trip or performs a minimal risk maneuver (defined below) depending on whether the sensor 38 is a member of a first set of the sensors 38 or a second set of the sensors 38. The process 500 is performed individually for each of the valves 36.

The process 500 begins in a decision block 505, in which the computer 42 determines whether a trigger for testing the valve 36 has occurred. A "trigger" is an event that, when detected, specifies that some action should occur, e.g., in this example following the trigger for testing, the testing of the valve 36 is to occur. A first trigger can be completion of the request to wash the sensor 38, as described above with respect to the decision block 425. A second trigger can be a determination that a timer has expired. The timer can be set to expire after a preset duration. The preset duration can be chosen to provide assurance that the valve 36 is operating correctly while not unduly wearing out the pump 34 and valve 36. A third trigger can be a state of the vehicle 30, e.g., that the vehicle 30 has started. If none of the triggers has occurred, the process 500 restarts to continue waiting for one of the triggers to occur. If any of the triggers has occurred, the process 500 proceeds to a block 510.

In the block 510, the computer 42 instructs the pump 34 to operate, i.e., to either begin or continue pumping. If the first trigger occurred, then the computer 42 instructs the pump 34 to continue operating after completion of the request to wash the sensor 38 without an interruption. If the second or third trigger occurred, then the computer 42 can instruct the pump 34 to begin operating.

Next, in a block 515, while the pump 34 is operating, the computer 42 instructs the valve 36 to close. If the first trigger occurred, then the computer 42 instructs the valve 36 to switch from the open position to the closed position. If the second or third trigger occurred, then the valve 36 is likely already in the closed position, and the computer 42 instructs the valve 36 to remain closed.

Next, in a block 520, while the pump 34 is operating and the valve 36 is instructed to be closed, the computer 42 receives data from the flowmeter 62. The data from the flowmeter 62 is a value of the rate of flow through the liquid supply line 66 from the valve 36 to the nozzle 40.

Next, in a decision block 525, the computer 42 determines whether flow is occurring from the valve 36 to the nozzle 40 based on the data received from the flowmeter 62 in the block 520. The computer 42 can determine that flow is occurring if the value of the flowrate is positive, i.e., greater than zero or greater than a standard level of noise in the data from the flowmeter 62. If no flow is occurring according to the data from the flowmeter 62, the process 500 proceeds to a block 530. If flow is occurring according to the data from the flowmeter 62, the process 500 proceeds to a block 545.

In the block 530, while the pump 34 is operating and the valve 36 is instructed to be closed, the computer 42 receives data from the sensor 38, as described above with respect to the block 405.

Next, in a decision block 535, the computer 42 determines whether the nozzle 40 is outputting fluid onto the sensor 38 based on the data received from the sensor 38 in the block 530. For example, the computer 42 can identify the spray pattern on the sensor window 58 based on the data received from the sensor 38 as a known type of spray pattern. For the purposes of this disclosure, "spray pattern" means an arrangement of the fluid output of the nozzle 40 onto the sensor window 58. The types of spray pattern can be a first spray pattern, a second spray pattern, and an absence of a spray pattern. The first spray pattern indicates that the valve 36 is in the partially open position, the second spray pattern indicates that the valve 36 is in the fully open position, and the absence of the spray pattern indicates that the valve 36 is in the fully closed position. For example, the computer 42 can identify the type of the spray pattern using conventional image-recognition techniques, e.g., a convolutional neural network programmed to accept images as input and output an identified type of obstruction. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of spray pattern, and the final output is the type of obstruction with the highest score. The convolutional neural network can be trained on images generated by the sensor 38 when the valve 36 is in the fully open, partially open, and fully closed positions. If the nozzle 40 is not outputting fluid onto the sensor 38, e.g., if the type of spray pattern is the absence of the spray pattern, then the process 500 restarts to wait for one of the triggers to occur. If the nozzle 40 is outputting fluid onto the sensor 38, e.g., if the type of spray pattern is the first spray pattern or the second spray pattern, then the process 500 proceeds to a decision block 540.

In the decision block 540, the computer 42 determines whether an alternative source of fluid is causing fluid to appear on the sensor 38. One alternative source of fluid can be, e.g., precipitation. The computer 42 can receive weather data, and the computer 42 can determine from the weather data whether precipitation is occurring. Alternatively or additionally, the computer 42 can receive data from a rain sensor. Another alternative source of fluid can be output by one of the nozzles 40 corresponding to a different valve 36 than the valve 36 being tested. For example, one of the nozzles 40 forward of the sensor 38 is outputting fluid, and forward motion of the vehicle 30 is causing the fluid to land on the sensor window 58. The computer 42 can determine if a different nozzle 40 is the alternative source of fluid by determining the speed and direction of the vehicle 30 and then checking if one of a set of nozzle 40 upstream of the sensor 38 is active, e.g., by checking whether the corresponding valves 36 are currently instructed to be open. If an alternative source of fluid is causing fluid to appear on the sensor 38, then the process 500 restarts to wait for one of the triggers to occur. If an alternative source of fluid is not causing fluid to appear on the sensor 38, then the process 500 proceeds to the block 545.

In the block 545, the computer 42 sets the flag. The flag is a value in the memory of the computer 42 indicating a status of the valve 36. The flag can be a diagnostic trouble code (DTC) or the like, or the computer 42 can set a DTC in addition to the flag. The flag can be a first flag or a second flag. The first flag indicates that the valve 36 is in the partially open position, and the second flag indicates that the valve 36 is in the fully open position.

If the computer 42 determined that flow was occurring in the decision block 525, then the computer 42 sets the first flag or second flag based on flowrate from the data from the flowmeter 62. If the flowrate is in a first range of flowrates, then the computer 42 sets the first flag. If the flowrate is in a second range of flowrates, then the computer 42 sets the second flag. The first range of flowrates indicates that the valve 36 is in a partially open position, and the second range of flowrates indicates that the valve 36 is in a fully open position. The first and second ranges of flowrates can be chosen based on testing the flowrates with the valve 36 known to be in the partially open and fully open positions.

If the computer 42 determined that the nozzle 40 was outputting fluid onto the sensor 38 in the decision block 535, then the computer 42 sets the first flag or second flag based on whether the spray pattern was identified as the first spray pattern or the second spray pattern. If the spray pattern was identified as the first spray pattern in the decision block 535, then the computer 42 sets the first flag. If the spray pattern was identified as the second spray pattern in the decision block 535, then the computer 42 sets the second flag.

It is useful to know whether the first flag or second flag is set when addressing the issue with the valve 36. If the first flag is set, i.e., if the valve 36 is in the partially open position, then the issue is more likely that dirt or other debris has entered the valve 36 and is preventing the valve 36 from completely closing. If the second flag is set, i.e., if the valve 36 is in the fully open position, then the issue is more likely that the instruction to close the valve 36 did not reach the valve 36 or that the valve 36 is experiencing a malfunction.

Next, in a decision block 550, the computer 42 determines whether the sensor 38 is a member of a first set of sensors 38 or a member of a second set of sensors 38. Each sensor 38 is a member of either the first set of sensors 38 or the second set of sensors 38, but not both. The first set of sensors 38 is selected based on which sensors 38 the vehicle 30 can operate autonomously without using. The second set of sensors 38 is selected based on which sensors 38 the vehicle 30 cannot operate autonomously without using. Whether each sensor 38 is in the first set or second set of sensors 38 can depend on whether the sensor 38 is necessary for coverage of a particular area around the vehicle 30 or whether the sensor 38 provides coverage redundant with other sensors 38. Whether any particular sensor 38 is a member of the first or second set can depend on other sensors 38 being nonoperational. For example, the sensors 38 that are front-facing can be in the first set of sensors 38 if all are operational, but if one of the front-facing sensors 38 is nonoperational, then the remaining front-facing sensors 38 can be in the second set of sensors 38. If the sensor 38 is in the first set of sensors 38, then the process 500 proceeds to a block 555. If the sensor 38 is in the second set of sensors 38, then the process 500 proceeds to a block 560.

In the block 555, the computer 42 autonomously operates the vehicle 30 while disregarding data received from the sensor 38. The computer 42 autonomously operates the vehicle 30 by using known autonomous-operation algorithms to instruct the propulsion 44, the brake system 46, and the steering system 48. After the block 555, the process 500 restarts to wait for one of the triggers to occur.

In the block 560, the computer 42 autonomously operates the vehicle 30 to perform a minimal risk maneuver. A minimal risk maneuver is a set of autonomous operations that puts the vehicle 30 in a minimal risk condition. For purposes of this disclosure, "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, Automated Driving Systems 2.0: A Vision for Safety, at 26 (citing SAE International J3016, International Taxonomy and Definitions for Terms Related to Driving Automation Systems for On-Road Motor Vehicles (J3016: September 2016)).) For example, the minimal risk maneuver may be initiating a handover to the human driver or autonomously driving the vehicle 30 to a halt at a roadside, i.e., stopping the vehicle 30 outside active lanes of traffic. The computer 42 may perform the minimal risk condition by using known autonomous-operation algorithms to instruct the propulsion 44, the brake system 46, and the steering system 48. After the block 560, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
    a pump;
    a valve supplied from the pump;
    a sensor fixed relative to the pump;
    a nozzle supplied from the valve and aimed at the sensor; and
    a computer communicatively coupled to the pump, the valve, and the sensor;
    wherein the computer is programmed to:
        instruct the pump to operate;
        while the pump is operating, instruct the valve to close;
        receive data from the sensor while the pump is operating and the valve is instructed to be closed; and
        set a flag upon determining, based on the data received from the sensor while the pump is operating and the valve is instructed to be closed, that the nozzle is outputting fluid onto the sensor.

2. The system of claim 1, further comprising a flowmeter positioned to monitor flow from the valve to the nozzle, wherein the computer is further programmed to receive data from the flowmeter while the pump is operating and the valve is instructed to be closed, and to set the flag upon determining, based on the data received from the flowmeter, that flow is occurring from the valve to the nozzle.

3. The system of claim 1, wherein the valve is a solenoid valve.

4. The system of claim 1, wherein the sensor is a camera including a lens, and the nozzle is aimed at the lens.

5. A computer comprising a processor and a memory storing instructions executable by the processor to:
    instruct a pump to operate;
    while the pump is operating, instruct a valve supplied from the pump to close;
    receive data from a sensor while the pump is operating and the valve is instructed to be closed; and
    set a flag upon determining, based on the data received from the sensor while the pump is operating and the valve is instructed to be closed, that a nozzle supplied from the valve is outputting fluid onto the sensor.

6. The computer of claim 5, wherein the flag is a first flag or a second flag, the instructions further include to set the first flag upon identifying, based on the data received from the sensor, a spray pattern of fluid outputted by the nozzle onto the sensor as a first spray pattern, and set the second flag upon identifying, based on the data received from the sensor, the spray pattern of fluid outputted by the nozzle onto the sensor as a second spray pattern.

7. The computer of claim 6, wherein the first spray pattern indicates that the valve is in a partially open position, and the second spray pattern indicates that the valve is in a fully open position.

8. The computer of claim 5, wherein the instructions further include to set the flag upon determining that the nozzle is outputting fluid onto the sensor and that an alternative source of fluid is not causing fluid to appear on the sensor.

9. The computer of claim 8, wherein the nozzle is a first nozzle, and the alternative source of fluid is one of precipitation or a second nozzle.

10. The computer of claim 5, wherein the instructions further include to receive data from a flowmeter positioned to monitor flow from the valve to the nozzle, wherein the data is received while the pump is operating and the valve is instructed to be closed, and the instructions further include to set the flag upon determining, based on the data received from the flowmeter, that flow is occurring from the valve to the nozzle.

11. The computer of claim 10, wherein the flag is a first flag or a second flag, the instructions further include to set the first flag upon determining, based on the data received from the flowmeter that a flowrate from the valve to the nozzle is in a first range of flowrates, and set the second flag upon determining, based on the data received from the flowmeter that the flowrate from the valve to the nozzle is in a second range of flowrates.

12. The computer of claim 11, wherein the first range of flowrates indicates that the valve is in a partially open position, and the second range of flowrates indicates that the valve is in a fully open position.

13. The computer of claim 5, wherein the instructions further include to, in response to setting the flag, autonomously operate a vehicle including the sensor while disregarding data received from the sensor.

14. The computer of claim 5, wherein the instructions further include to, in response to setting the flag, autonomously operate a vehicle including the sensor to perform a minimal risk maneuver.

15. The computer of claim 5, wherein the instructions further include to, in response to setting the flag, upon determining that the sensor is a member of a first set of sensors, autonomously operate a vehicle including the sensor while disregarding data received from the sensor, and in response to setting the flag, upon determining that the sensor is a member of a second set of sensors, autonomously operate a vehicle including the sensor to perform a minimal risk maneuver.

16. The computer of claim 5, wherein the instructions further include to, in response to a request to wash the sensor, instruct the pump to operate and the valve to open.

17. The computer of claim 16, wherein the instructions further include to, upon determining that the request to wash the sensor is complete, perform the steps of instructing the pump to operate, instructing the valve to close, receiving the data from the sensor, and setting the flag upon determining that the nozzle is outputting fluid onto the sensor.

18. The computer of claim 5, wherein the instructions further include to, upon determining that a timer has expired, perform the steps of instructing the pump to operate, instructing the valve to close, receiving the data from the sensor, and setting the flag upon determining that the nozzle is outputting fluid onto the sensor.

19. The computer of claim 5, wherein the instructions further include to, upon determining that a vehicle including the sensor has started, perform the steps of instructing the pump to operate, instructing the valve to close, receiving the data from the sensor, and setting the flag upon determining that the nozzle is outputting fluid onto the sensor.

20. A method comprising:
instructing a pump to operate;
while the pump is operating, instructing a valve supplied by the pump to close;
receiving data from a sensor while the pump is operating and the valve is instructed to be closed; and
setting a flag upon determining, based on the data received from the sensor while the pump is operating and the valve is instructed to be closed, that a nozzle supplied from the valve is outputting fluid onto the sensor.

* * * * *